(12) United States Patent
Johll, Jr. et al.

(10) Patent No.: US 6,383,382 B1
(45) Date of Patent: May 7, 2002

(54) DUAL CARTRIDGE MEDIA HOUSING

(75) Inventors: William P. Johll, Jr.; Charles T. Nachtman; Helmut R. H. Gideon; Timothy T. Dunwoody; Jamie C. Carr, all of Dubuque, IA (US); Thomas Scholz, Mt. Sinai, NY (US)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 09/733,770

(22) Filed: Dec. 8, 2000

(51) Int. Cl.[7] ................................................. B01D 27/14
(52) U.S. Cl. ........................ 210/266; 210/282; 210/284; 210/289
(58) Field of Search ................................ 210/266, 282, 210/284, 286, 289, 291

(56) References Cited

U.S. PATENT DOCUMENTS

| 69,433 A | * | 10/1867 | Henshaw | 210/284 |
| 4,196,081 A | * | 4/1980 | Pavia | 210/284 |
| 4,855,046 A | * | 8/1989 | Meehan | 210/284 |
| 5,041,219 A | * | 8/1991 | Strand et al. | 210/286 |
| 5,925,240 A | | 7/1999 | Wilkins et al. | 210/88 |

* cited by examiner

Primary Examiner—Ivars Cintins
(74) Attorney, Agent, or Firm—Chernoff, Vilhauer, McClung & Stenzel, LLC

(57) ABSTRACT

An internally plumbed housing for containing fluid purification media especially suitable for the production of ultra-pure water. The device may be installed in a system for the production of laboratory grade water or may be used with pressurized feed for the delivery of purified water or other fluids in multiple applications.

5 Claims, 4 Drawing Sheets

DUAL CARTRIDGE MEDIA HOUSING

BACKGROUND OF THE INVENTION

The production of laboratory grade ultrapure water or other fluid reagents often requires contacting the fluid feed with various solid filtration and/or adsorption media to free the water from minute quantities of pollutants such as organic compounds, flocculants and dissolved ionic material. See, for example, U.S. Pat. Nos. 5,868,924 and 5,925,240. There is a need in the art for appropriately designed devices for containing such solid media to maximize efficient contact between the fluid and the media.

BRIEF SUMMARY OF THE INVENTION

The media housing of the present invention consists of top and bottom end caps secured to a dual cartridge media container provided with internal flow conduits and flow distributors and with recesses at the inlet and outlet of each cartridge to accommodate porous discs or screens that act as prefilters and to contain purification media within the cartridges. The inside diameter of each cartridge is such as to accommodate linear cross sectional velocity requirements for ion exchange resin applications, while the overall volume of the dual cartridge is such as to provide sufficient empty bed contact time and depth to satisfy application and design requirements for the use of activated carbons, ion exchange resins, catalysts and other purification and filtration media.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
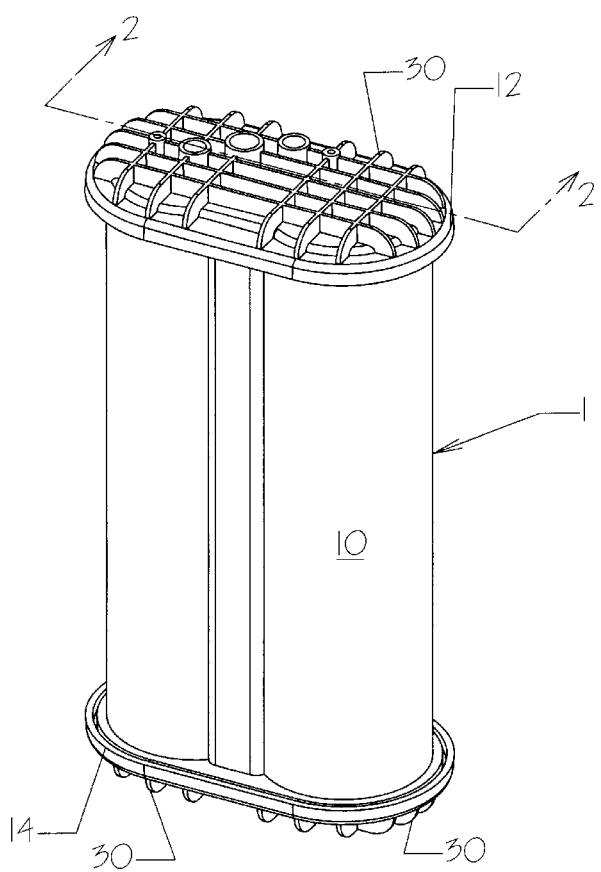
FIG. 1 is a perspective view of the dual cartridge media housing of the present invention.
Figure 2:
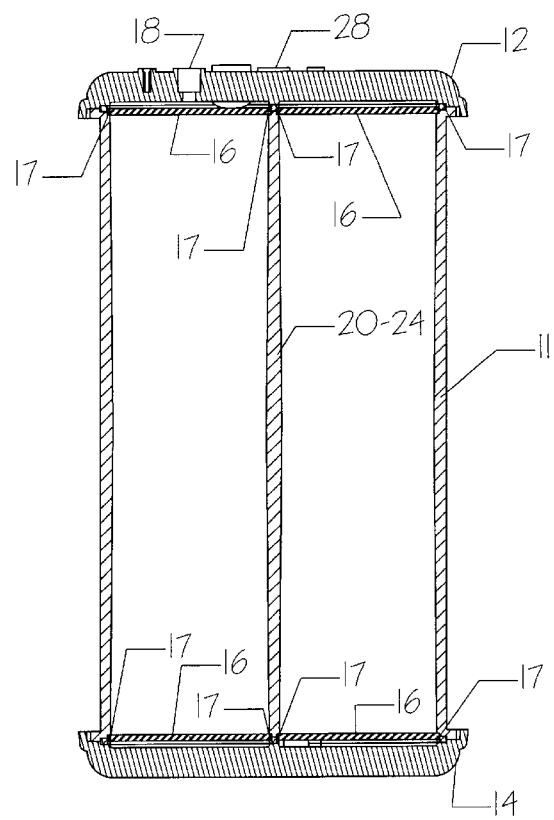
FIG. 2 is a cross sectional view taken through 2—2 of FIG. 1.
Figure 3:
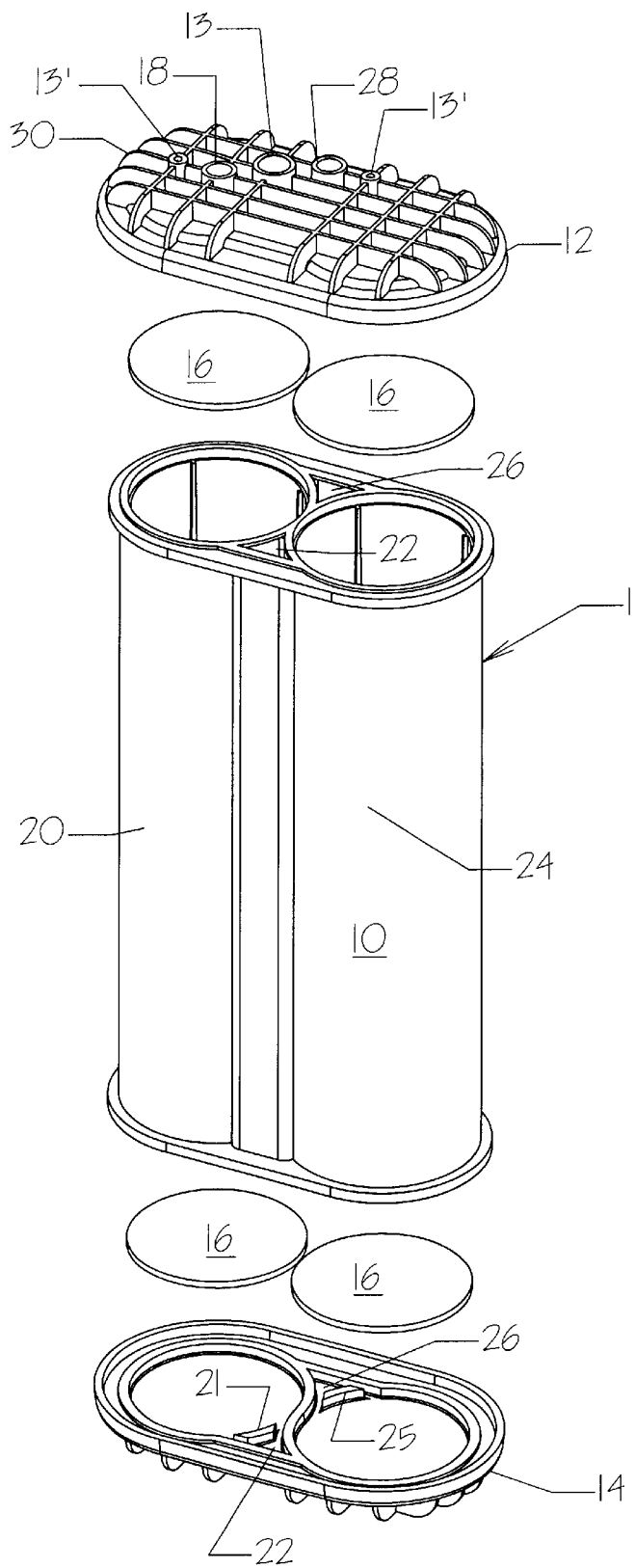
FIG. 3 is an exploded view of FIG. 1.
Figure 4:
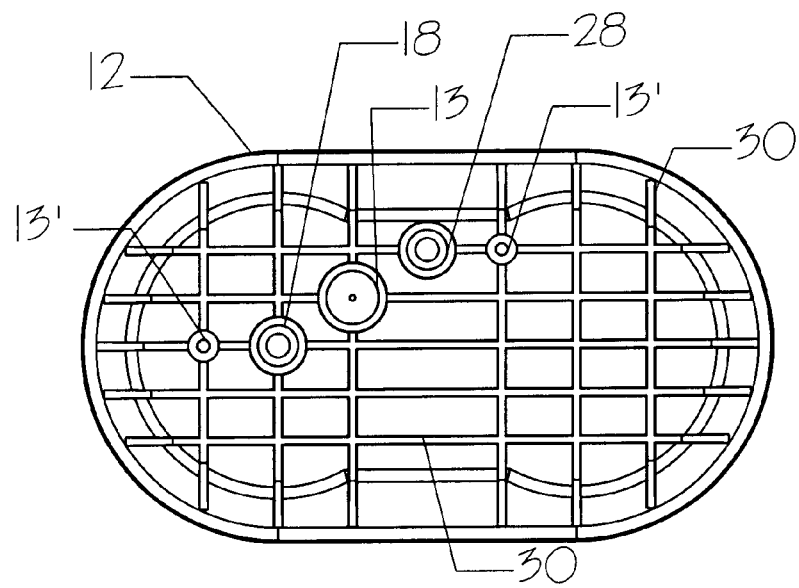
FIG. 4 is an elevational view of the outside of the top end cap.
Figure 5:
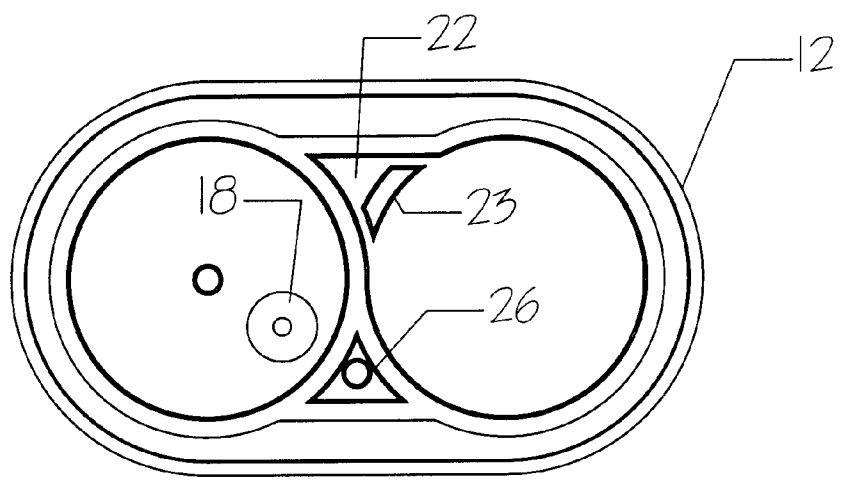
FIG. 5 is an elevational view of the inside of the top end cap.
Figure 6:
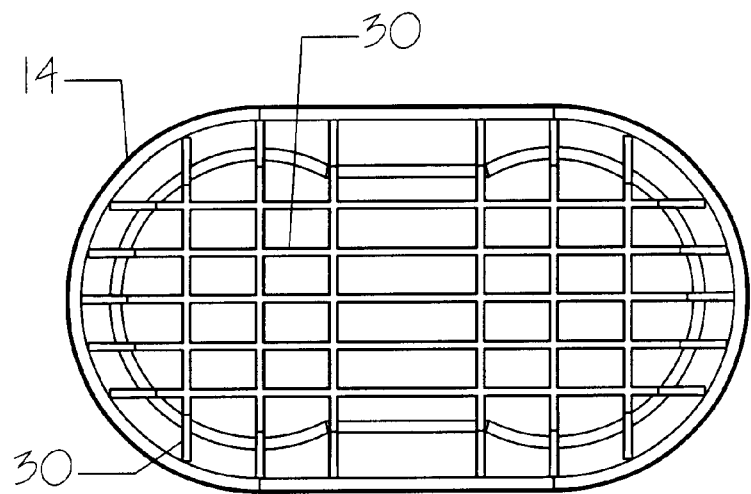
FIG. 6 is an elevational view of the outside of the bottom end cap.
Figure 7:
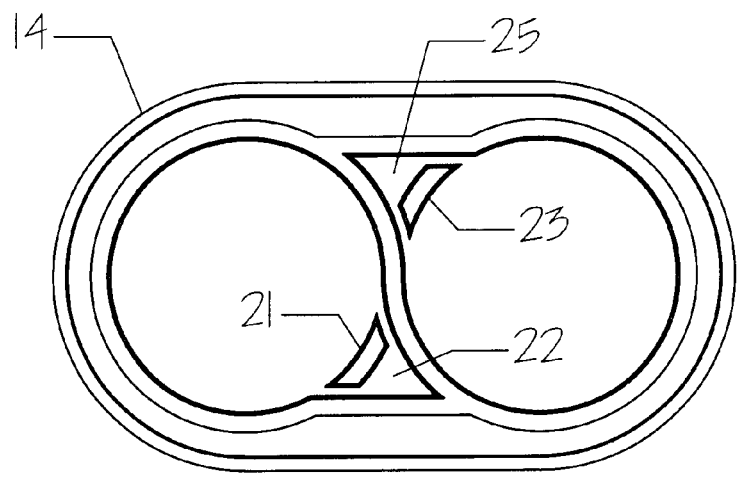
FIG. 7 is an elevational view of the inside of the bottom end cap.

An exemplary device of the present invention includes two cartridges molded together as a single piece with a common wall and having two smaller conduits or plenums located adjacent the common wall between the two cartridges. One of the smaller conduits is used for fluid communication between the bottom of the first cartridge and the top of the second cartridge when the end caps are attached. The second smaller conduit is used to allow fluid to flow from the bottom of the second cartridge to the outlet for delivery of permeate or purified fluid from the device.

In an especially preferred embodiment the cartridges are cylindrical and the smaller conduits have a triangular cross sectional shape. The triangular cross sectional shape of these smaller conduits or plenums adds strength to the device while saving space. Advantages of such a dual cartridge design include the minimization of parts and reduction in assembly time. As compared to standard external plumbing typically used to hydraulically connect multiple media containers in similar applications, the internal plumbing of the present invention leads to an efficient use of space.

Turning to the drawings, wherein like numerals refer to the same elements, there is shown a dual cartridge media housing 1 comprising a housing body 10 having a top end cap 12 and a bottom end cap 14. End caps 12 and 14 are preferably provided with reinforcing ribs 30. Top end cap 12 is provided with fluid inlet port 18 and permeate outlet port 28. Top end cap 12 may also be provided with a latch boss 13 and mounting bosses 13' for securing an inlet and outlet nozzle assembly (not shown), said assembly being the subject of copending application Ser. No. 09/733,588, filed concurrently. Housing body 10 and end caps 12 and 14 may be made of any suitable material such as 316 or 316L stainless steel or thermoplastic polymers, preferably the latter and the three components may be secured together by any suitable means; in the case of thermoplastic polymers the three components are preferably welded together. Preferred polymeric materials of construction include polyethylene, polypropylene, polytetrafluoroethylene, polyvinylidene fluoride, fluorinated ethylene/perfluoroalkyl vinyl ether copolymer and polyetheretherketone.

Housing body 12 includes first cartridge 20 and second cartridge 24 bound together by common wall 20–24. Both ends of both first cartridge 20 and second cartridge 24 are fitted with porous screens 16 to act as both a prefilter for large particles and to retain filtration and/or adsorption media/ the screens fitting into screen-receiving recesses 17 countersunk into housing body wall 11 and common wall 20–24. The porous screens in the cartridge pack may be constructed of the same types of material as the cartridge pack.

In operation, fluid to be filtered or otherwise treated with media such as activated carbon or ion exchange media enters fluid inlet port 18 in top end cap 12, flows downwardly through porous screen 16 and first cartridge 20, then downwardly through media contained in first cartridge 20 through lower screen 16, then encounters first cartridge flow collector 21 which directs the first cartridge permeate upwardly through first cartridge permeate plenum 21 to the top of second cartridge 24. At the top of second cartridge 24 the fluid permeate from the first cartridge encounters second cartridge flow distributor 23, which causes the flow to be distributed uniformly downwardly through porous screen 16 and the media of second cartridge 24. At the bottom of second cartridge 24 the permeate flows through screen 16 and encounters second cartridge flow collector 25 which directs the fluid permeate upwardly through second cartridge permeate plenum 26 and out through permeate outlet port 28.

Fabrication of the housing of the invention is straightforward, comprising placing the two porous screens 16 into the recesses 17 provided inside the end of each cartridge 20 and 24. The top or bottom end cap 12 or 14 is then secured to the dual cartridges 20 and 24, preferably by welding. The welding operation captures the porous screens 16 in the welding flash while the end cap 12 or 14 is welded to the dual cartridges. The cartridges are then loaded with fluid filtration/treatment media and the other end cap is secured to the housing body. In general when more than one medium is utilized, the media are placed in the device in discrete layers. One layer of media is normally used to remove a particular contaminant before it reaches a subsequent media layer. For example, activated carbon may be used to remove chlorine and organic contaminants from the fluid feed before it reaches ion exchange resin media to prevent oxidation or fouling. Some media, such as mixed bed ion exchange resins and multimedia material, are supplied as mixed materials and used in that form.

The size of the device can be adjusted to meet linear cross sectional velocity (flow rate) and empty bed contact time requirements for a given application. In an exemplary embodiment the device has a nominal tube diameter of 3 inches with a nominal 12-inch internal length from screen to screen with a single tube volume of about 1.4 L or 2.8 L for the dual cartridge. For ion exchange applications the cross sectional area of the tube will allow for a linear cross sectional velocity of from approximately 1 to about 4 L/min. Higher or lower flow rates may be utilized depending on feed solution characteristics and desired effluent quality. Flow rates can be adjusted externally to accommodate desired empty bed contact time relative to feed solution characteristics and effluent quality requirements. For example, a flow rate of 1.0 L/min. would have an empty bed contact time of 2.8 minutes when activated carbon is used as the media.

The flow distributors and collectors of the housing of the present invention contribute greatly to the efficiency of operation. Fluid passing through the bottom screen 16 travels to the permeate plenum 22 via flow collector 21, which splits the stream into two opposing directions which cancel each other to provide an even flow pattern. Thus, flow collector 21 collects fluid from both clockwise and counterclockwise directions to eliminate or reduce the potential for channeling in the upstream media. Once the fluid reaches permeate plenum 22 it travels upwardly to top end cap 12, then passes through a flow distributor 23 for clockwise and counterclockwise fluid distribution over top porous screen 16. Once enough fluid is collected and pressure is generated, the fluid passes downwardly through porous screen 16 and the media located in the second cylinder. Fluid passing through the bottom porous screen 16 of the second cylinder passes through yet another flow collector 25, which functions in the same fashion as flow collector 21 to create even flow of the fluid from the media. The fluid than travels upwardly again in a second permeate plenum 26 to the top end cap 12 through outlet port 28 for delivery of the purified fluid. In addition to the advantages noted above, such flow collector/distributors further provide flow path for the solution should one of the openings be plugged or restricted with welding flash.

Two or more of the dual cartridge housings of the present invention may be placed in fluid communication with each in series whereby, for example, the outlet of a first housing is placed in fluid communication with the inlet of a second housing, the outlet of the second housing is placed in fluid communication with a third housing, and so on, so as to achieve further treatment stages.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A housing for containing solid fluid purification media comprising:

(a) two cartridges having a common longitudinal wall;
 (b) two longitudinal plenums arranged adjacent to said common longitudinal wall;
 (c) two end caps adapted to mate with said two cartridges wherein one of said end caps is provided with a fluid inlet and a fluid outlet, said fluid inlet being in fluid communication with one of said two cartridges and said fluid outlet being in fluid communication with one of said two longitudinal plenums;
 (d) a flow distributor located in each of said two end caps at the ends of said two longitudinal plenums, each of said flow distributors being adapted to intercept fluid and distribute said fluid substantially uniformly; and
 (e) porous screens between said cartridges and said end caps.

2. The housing of claim 1 wherein said two cartridges are substantially cylindrical.

3. The housing of claim 2 wherein said longitudinal plenums have a triangular cross sectional shape.

4. The housing of claim 1 wherein said flow distributors have a triangular shape.

5. The housing of claim 1 wherein said end cap provided with a fluid inlet and a fluid outlet is further provided with means for securing inlet and outlet nozzles to said fluid inlet and said fluid outlet.

* * * * *